(12) United States Patent
Kim et al.

(10) Patent No.: US 7,884,895 B2
(45) Date of Patent: Feb. 8, 2011

(54) PORTABLE DISPLAY DEVICE

(75) Inventors: Sung Hwan Kim, Ulsan (KR); Tae Soo Kim, Ulsan (KR); Kyu Han Bae, Ulsan (KR); Kyu Seob Han, Ulsan (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 380 days.

(21) Appl. No.: 11/580,563

(22) Filed: Oct. 13, 2006

(65) Prior Publication Data

US 2007/0132917 A1    Jun. 14, 2007

(30) Foreign Application Priority Data

Dec. 8, 2005    (KR) .................... 10-2005-0119868

(51) Int. Cl.
*G02F 1/1335* (2006.01)
(52) U.S. Cl. ...................................... 349/65
(58) Field of Classification Search ............. None
See application file for complete search history.

(56) References Cited

U.S. PATENT DOCUMENTS

2007/0070264 A1 *  3/2007  Fujita et al. .................. 349/61

FOREIGN PATENT DOCUMENTS

| CN | 245520 Y | 8/2001 |
|---|---|---|
| JP | 10-319860 | 12/1998 |
| JP | 2002-40954 | 2/2002 |
| JP | 2002-98945 | 4/2002 |
| JP | 2002-249741 | 9/2002 |
| JP | 2004-62060 | 2/2004 |
| JP | 2004-354796 | 12/2004 |
| JP | 2005-24774 | 1/2005 |
| JP | 2005-099221 | 4/2005 |
| JP | 2005099221 A * | 4/2005 |
| JP | 2005-213282 | 8/2005 |
| JP | 2005-250304 | 9/2005 |
| KR | 1998-083170 | 12/1998 |
| KR | 2002-0096960 | 12/2002 |
| KR | 2003-0054764 | 7/2003 |
| KR | 10-2005-0008278 | 1/2005 |

OTHER PUBLICATIONS

Patent Abstracts of Japan, Publication No. 10-319860; Publication Date: Dec. 4, 1998; in the name of Gomi et al.
Patent Abstracts of Japan, Publication No. 2002-098945; Publication Date: Apr. 5, 2002; in the name of Miyazaki.
Office Action for corresponding Korean Patent Application No. 10-2005-0119868 dated Oct. 18, 2006.

(Continued)

*Primary Examiner*—Sung H Pak
(74) *Attorney, Agent, or Firm*—Christie, Parker & Hale, LLP (57) ABSTRACT

A portable display device including a liquid crystal display panel, a backlight assembly having a light source for supplying light to the liquid crystal display panel, a mold frame included in the backlight assembly, the mold frame formed with a step unit such that the liquid crystal display panel can be mounted in the mold frame, and a light fence located in the step unit, the light fence screening light supplied from the light source to the liquid crystal display panel.

8 Claims, 7 Drawing Sheets

OTHER PUBLICATIONS

Korean Patent Abstracts for Publication No. 100460406 B1; Date of Publication of Application Nov. 29, 2004 in the name of Kim, corresponding to Application No. 101997001838.

Korean Patent Abstracts for Publication No. 1020030054764 A; Date of Publication of Application Jul. 2, 2003 in the name of Lee et al.

European Search Report dated May 9, 2007, for EP 06256261.6, in the name of Samsung SDI Co., Ltd.

Korean Patent Abstracts, Publication No. 1020020096960 A; dated Dec. 31, 2002 in the name of Norihisa Fukayama, et al.

Korean Patent Abstracts, Publication No. 1020050008278 A; dated Jan. 21, 2005 in the name of Yong Il Kim.

SIPO Office action dated Aug. 8, 2008, for corresponding China application 20061016841963, with English translation indicating relevance of listed reference in this IDS.

Japanese Office action dated Dec. 22, 2009, for corresponding Japanese application 2006-131967, noting listed references in this IDS.

Japanese Office action dated Apr. 13, 2010, for corresponding Japanese Patent application 2006-131967, noting listed references in this IDS, as well as JP 2005-099221 previously filed in an IDS dated Feb. 9, 2010.

* cited by examiner

PORTABLE DISPLAY DEVICE

CROSS-REFERENCE TO RELATED APPLICATIONS

This application claims priority to and the benefit of Korean Patent Application No. 2005-119868, filed on Dec. 8, 2005, in the Korean Intellectual Property Office, the entire content of which is incorporated herein by reference.

BACKGROUND

1. Field of the Invention

The present invention relates to a portable display device, and more particularly to a portable display device having improved light leakage prevention.

2. Discussion of Related Art

Recently, various flat panel display devices have been developed having reduced weight and size. Exemplary flat panel display devices include a liquid crystal display, a field emission display, a plasma display panel, a light emitting display, etc.

Particularly, liquid crystal displays have become popular as an alternative to cathode ray tubes due to the liquid crystal displays' small size, light weight, and low power consumption. Such devices may be used in large-sized monitors and televisions as well as mobile phones and personal digital assistants (PDAs).

Figure 1:
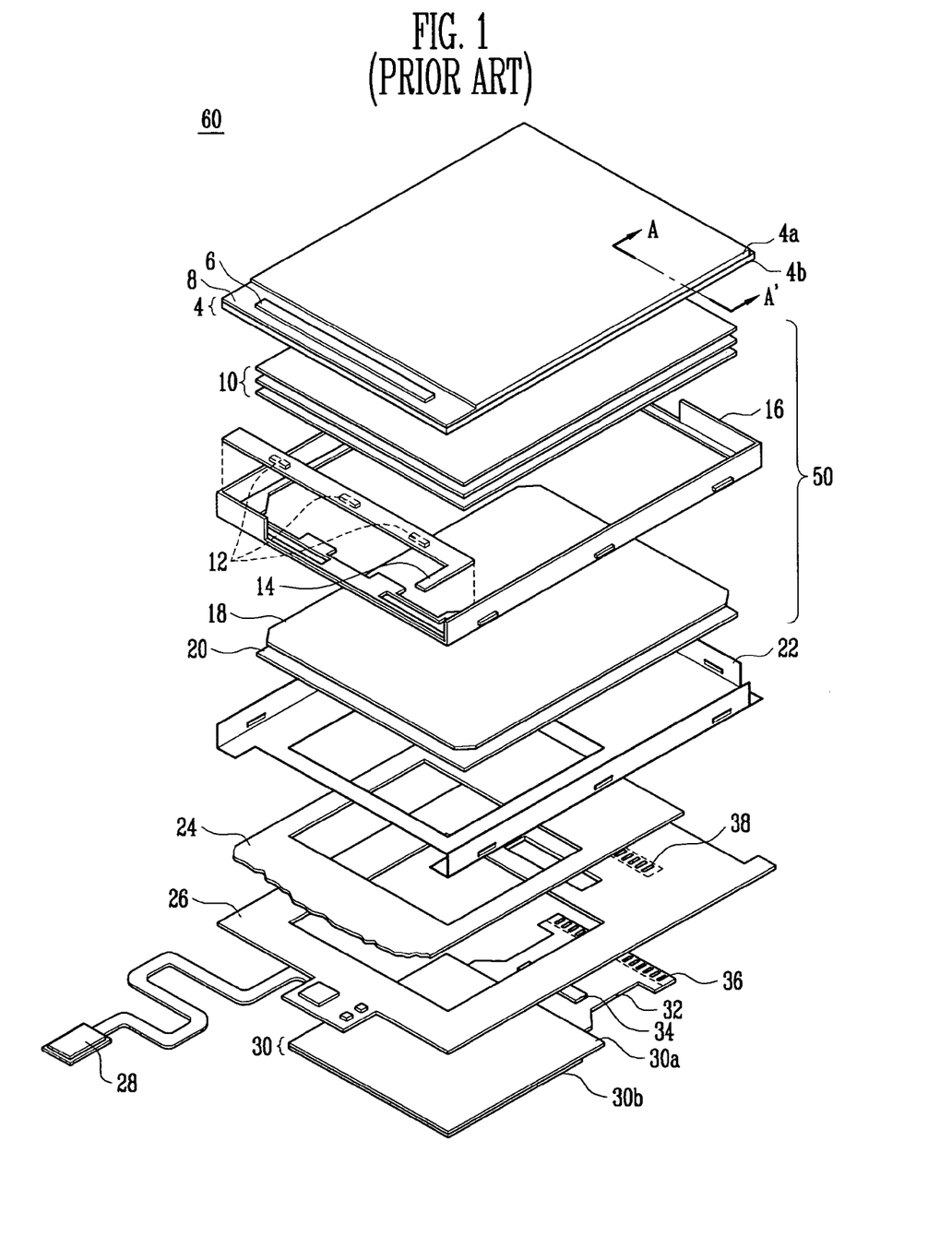
FIG. 1 is an exploded prospective view of a conventional portable display device.
Figure 2:
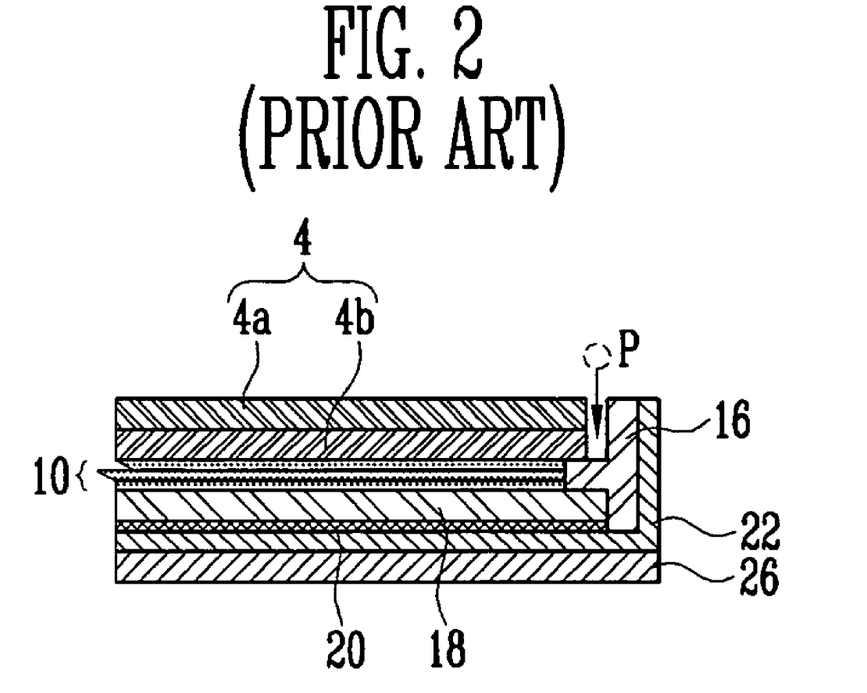
FIG. 2 is an assembled sectional view taken along line A-A' of FIG. 1.

FIG. 1 is a exploded prospective view of a conventional portable display device. FIG. 1 shows a dual display device used in a mobile phone and the like and mounted with at least one liquid crystal display. FIG. 2 is an assembled sectional view taken along line A-A' of FIG. 1.

Referring to FIGS. 1 and 2, the conventional portable display device 60 includes a liquid crystal display panel 4, a backlight assembly 50, a bottom chassis 22, a first printed circuit board 24, a second printed circuit board 26, and a light-emitting display panel 30.

The liquid crystal display panel 4, displays predetermined images using a first substrate 4a, a second substrate 4b and a liquid crystal (not shown) injected between the first substrate 4a and the second substrate 4b.

The second substrate 4b includes a plurality of thin film transistors (TFT) arranged in matrix form. A source electrode of the TFT is connected to a data line, and a gate electrode thereof is connected to a scan line. A drain electrode of the TFT is connected to a pixel electrode made of transparent indium tin oxide (ITO), a conductive material. The TFTs are turned on when the scan line is supplied with a scan signal, and the TFTs supply a data signal from the data line to the pixel electrode.

An integrated circuit 6 is inserted on one side of the second substrate 4b, and the data signal and scan signal are supplied from the integrated circuit 6. A protective layer 8 is deposited around the integrated circuit 6.

The first substrate 4a is arranged facing the second substrate 4b. A common electrode made of ITO is deposited on the front surface of the first substrate 4a. The common electrode is applied with a predetermined voltage, and accordingly a predetermined electric field is generated between the common electrode and the pixel electrode. The array angle of the liquid crystal injected between the first substrate 4a and the second substrate 4b varies with the electric field, and the optical transparency also varies according to array angle to thereby display desired images. Upper and lower polarized light films (not shown) are provided in the upper and lower sides of the liquid crystal display panel 4.

The backlight assembly 50 includes a mold frame 16, LEDs 12, an LED substrate 14, a light guide plate 18, a reflective plate 20 and optical sheets 10.

The LEDs 12 emit an amount of light corresponding to a drive signal from the LED substrate 14. The light guide plate 18 supplies the light from the LEDs 12 to the liquid crystal display panel 4. That is, the light guide plate 18 supplies the light from its side surface to the liquid crystal display panel 4 located on its upper side.

The reflective plate 20 arranged on a back surface of the light guide plate 18 supplies incidence light from the light guide plate 18 back to the light guide plate 18. The optical sheets 10 enhance the brightness of light from the light guide plate 18 to supply the enhanced light to the liquid crystal display panel 4.

The LED substrate 14, which is connected to the first printed circuit board 24, supplies the drive signal to the LEDs 12 corresponding to control signal from the first printed circuit board 24. The LED substrate 14 mounted with LEDs 12 is received and fixed in the mold frame 6. Additionally, the liquid crystal display panel 4 and backlight assembly 50 are fixed and supported in the mold frame 16.

The bottom chassis 22 is fixed to the mold frame 16 on the lower side thereof. An opening is formed in a portion of the bottom chassis 22 such that a light emitting display panel 30 may be inserted therein.

The second printed circuit board 26 is supplied with a drive signal from a drive circuit (not shown) located in the mobile phone side by a mobile phone connector 28. The mobile phone connector 28 is fixed to another connector attached to the drive circuit located in the mobile phone side to be supplied with the drive signal from the drive circuit in the mobile phone side. The second printed circuit board 26 supplied with the drive signal generates various control signals corresponding to the drive signal.

The first printed circuit board 24 is connected to the second printed circuit board 26 through a first pad unit 38 formed in the second printed circuit board 26. The first printed circuit board 24 is connected to the integrated circuit 6 of the liquid crystal display panel 4 and LED substrate 14 by a flexible printed circuit board (not shown). The first printed circuit board 24 connected to the integrated circuit 6 and LED substrate 14 drives the integrated circuit 6 and LED substrate 14 corresponding to the control signals supplied from the second printed circuit substrate 26.

The light emitting display panel 30 includes a first substrate 30a and a second substrate 30b. Organic LEDs (not shown) are arranged on the first substrate 30a in matrix form. Organic LEDs generate a predetermined amount of light corresponding to the amount of current supplied. The light emitting display panel 30 is connected to the second printed circuit board 26 by the second pad unit 36 of the flexible printed circuit board 32. An integrated circuit 34 is mounted on the flexible printed circuit board 32. The integrated circuit 34 lets the light emitting display panel 30 to display a predetermined image in response to the control signals supplied from the second printed circuit board 26.

However, the conventional portable display device 60 may allow light to leak into an undesired region. More specifically, since the light supplied from the backlight assembly 50 is emitted to the non-pixel regions of liquid crystal display panel 4, the light efficiency and the image quality of the conventional portable display device are deteriorated. In addition, as shown in FIG. 2, if debris P enters the backlight assembly 50 through a space between the liquid crystal display panel 4 and the mold frame 16, light is blocked and the image quality is further deteriorated. Further, conventional portable display devices 60 have relatively weak mold frames since the panel 4 is mounted to and supported by the mold frame 16.

SUMMARY OF THE INVENTION

A portable display device is provided which enhances the light efficiency and prevents light leakage. Additionally, a portable display device is provided which enhances the connection between the liquid crystal display panel and the mold frame to prevent debris from entering the backlight assembly.

A portable display device is provided including a backlight assembly having a light source for supplying light to the display panel and having a mold frame with a periphery step platform. A light fence is mounted in the periphery step platform, the light fence supporting the display panel and screening at a periphery of the backlight assembly light supplied from the light source.

In one exemplary embodiment, the light fence is superimposed on a non-pixel region of the liquid crystal display panel. A predetermined part of the light fence is formed with a opening corresponding to a pixel region of the liquid crystal display panel. The liquid crystal display panel is located in the upper side of the light fence, and at least one optical sheet is located in the lower side of the light fence to enhance the uniformity or brightness of light supplied from the light source. Both surfaces of the light fence may be opaque. Both surfaces of the light fence may be different colors from each other. A first surface, which adjoins the liquid crystal display panel, of both surfaces of the light fence, may be opaque, and a second surface, which adjoins the step unit, is set up in a reflective color such as white or silver. The light fence may be double-sided tape. The light fence surrounds the rear perimeter of the liquid crystal display panel, and the pixel region of the liquid crystal display panel is located within an enclosed region of the light fence.

An alternate embodiment of a light fence for a display device includes a planar frame sized to conform to the display area and having an inner through-hole sized to correspond to at least a portion of the non-display area, the planar frame being mountable on the step unit and having a first planar surface and a second planar surface, the first planar surface and the second planar surface being respectively both opaque or the first planar surface being opaque and the second planar surface being reflective.

DETAILED DESCRIPTION

Referring to FIGS. 3, 4, 5A and 5B, a portable display device 160 according to an embodiment of the present invention includes a liquid crystal display panel 104, a backlight assembly 150, a bottom chassis 122, a first printed circuit board 124, a second printed circuit board 126, a light-emitting display panel 130, and a light fence 105 placed between the liquid crystal display panel 104 and the backlight assembly 150.

Figure 3:
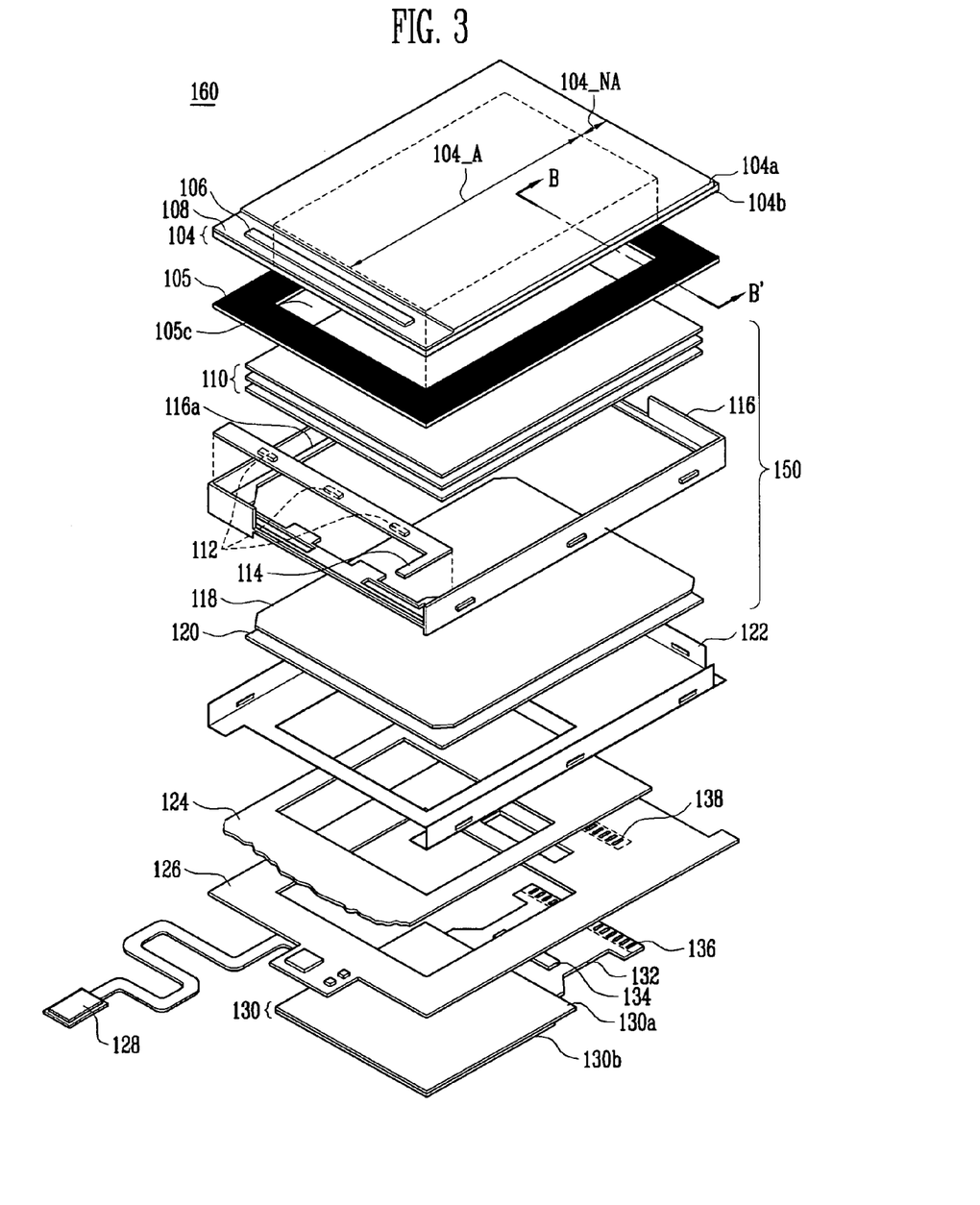
FIG. 3 is an exploded prospective view of a portable display device having a light fence according to one embodiment of the present invention.
Figure 4:
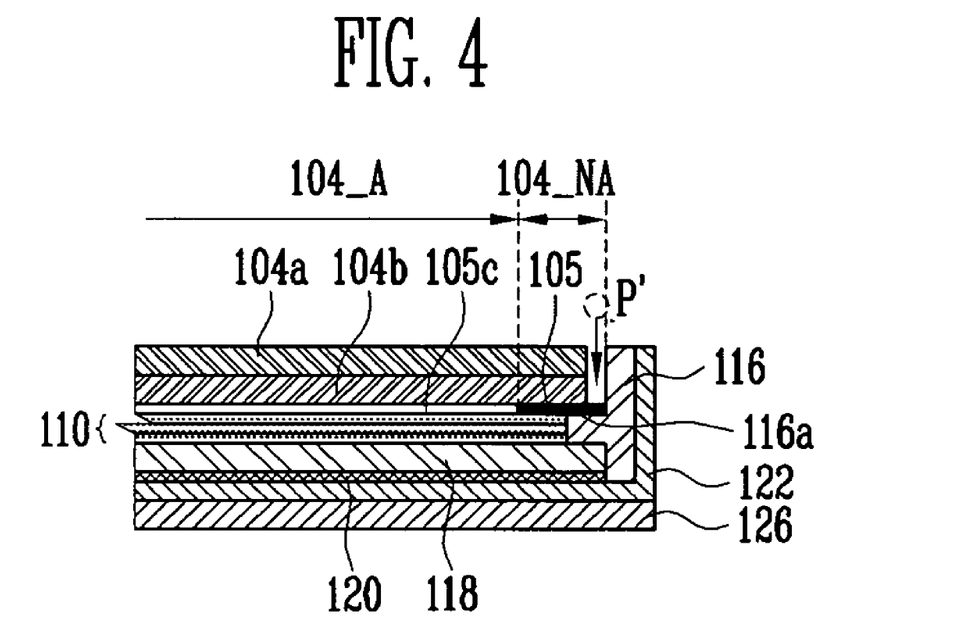
FIG. 4 is an assembled sectional view taken along line B-B' of FIG. 3.
Figure 5A:
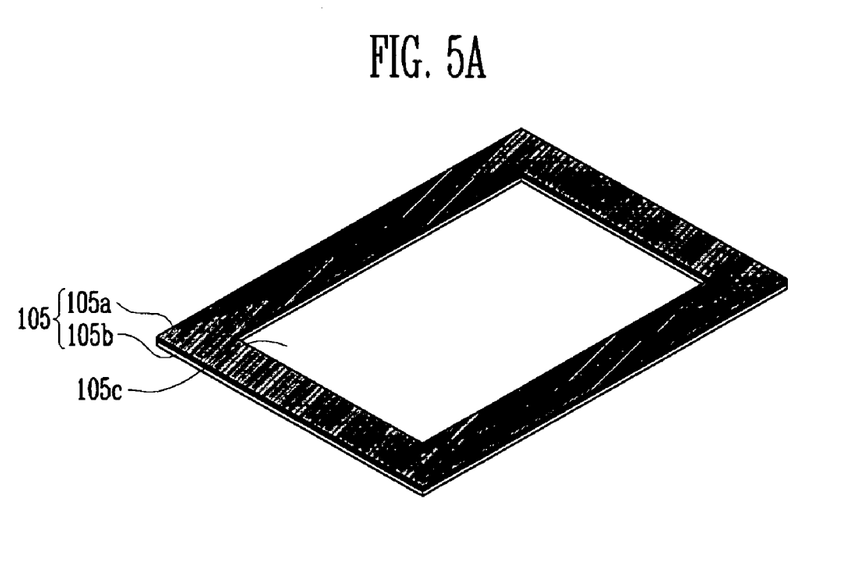
FIGS. 5A and 5B are prospective views of one side and its opposite side of a light fence according to the embodiment of the present invention shown in FIGS. 3 and 4.
Figure 5B:
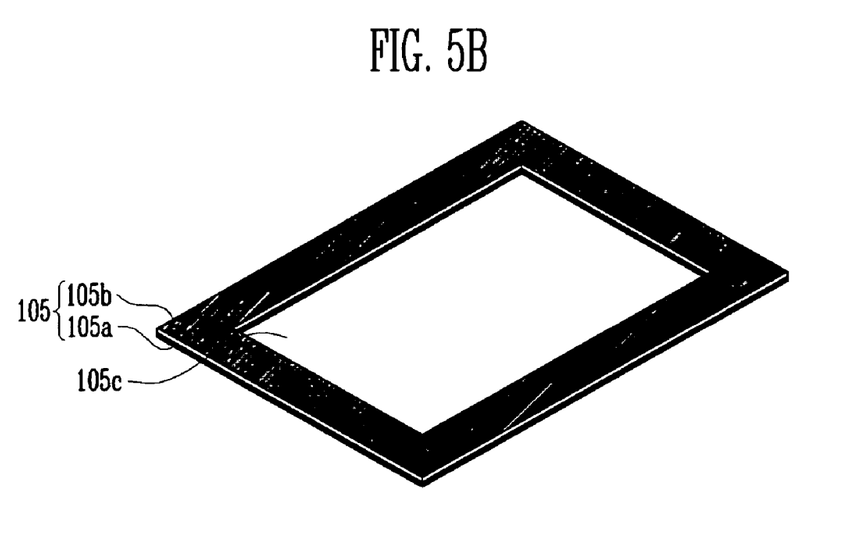

The liquid crystal display panel 104, displays predetermined images and includes a first substrate 104a, a second substrate 104b and a liquid crystal (not shown) injected between the first substrate 104a and the second substrate 104b.

The second substrate 104b includes a plurality TFTs arranged in matrix form. A source electrode of the TFT is connected to a data line, and a gate electrode thereof is connected to a scan line. A drain electrode of the TFT is connected to a pixel electrode made of transparent ITO. The TFTs are turned on when the scan line is supplied with a scan signal, and the TFTs supply a data signal from the data line to the pixel electrode.

An integrated circuit 106 is inserted on one side of the second substrate 104b, and the data signal and scan signal are supplied from the integrated circuit 106. A protective layer 108 is deposited around the integrated circuit 106.

The first substrate 104a is arranged facing the second substrate 104b. A common electrode made of ITO is applied on the front surface of the first substrate 104a. The common electrode is applied with a predetermined voltage, generating a predetermined electric field between the common electrode and the pixel electrode. The array angle of the liquid crystal injected between the first substrate 104a and the second substrate 104b varies with the electric field, and the optical transparency varies according to the array angle to thereby display desired images. Upper and lower polarized light films (not shown) are provided in the upper and lower sides, respectively, of the liquid crystal display panel 104.

The backlight assembly 150 includes a mold frame 116, LEDs 112, a LED substrate 114, a light guide plate 118, a reflective plate 120 and optical sheets 110.

The LEDs 112 emit a predetermined amount of light corresponding to a drive signal from the LED substrate 114. The light guide plate 118 supplies the light from the LEDs 112 to the liquid crystal display panel 104.

The reflective plate 120 which is arranged in the back surface of the light guide plate 118 supplies the incidence light from the light guide plate 118 back to the light guide plate 118 to improve optical efficiency.

The first optical sheets 110 enhance the uniformity and brightness of light from the light guide plate 118 to supply the enhanced light to the liquid crystal display panel 104.

The LED substrate 114 which is connected to the first printed circuit board 124 supplies the drive signal to the LEDs 112 corresponding to control signal from the first printed circuit board 124.

The LED substrate 114 mounted with LEDs 112 is fixed to the mold frame 116. Additionally, the liquid crystal display panel 104 and backlight assembly 150 are fixed and supported by the mold frame 116. A step unit 116a for receiving the liquid crystal display panel 104 is formed on the inner side surface of the mold frame 116.

The bottom chassis 122 is fixed to the mold frame 116 underneath the mold frame. An opening is formed in a portion of the bottom chassis 122 such that a light emitting display panel 130 may be inserted therein.

The second printed circuit board 126 is supplied with the drive signal from a drive circuit (not shown) located in the mobile phone side by a mobile phone connector 128. The mobile phone connector 128 is fixed to another connector attached to the drive circuit located in the mobile phone side to be supplied with the drive signal from the drive circuit. The second printed circuit board 126 supplied with the drive signal generates various control signals corresponding to the drive signal.

The first printed circuit board 124 is connected to the second printed circuit board 126 through a first pad unit 138 formed in the second printed circuit board 126. The first printed circuit board 124 is connected to the integrated circuit 106 of the first liquid crystal display panel 104 and LED substrate 114 by a flexible printed circuit board (not shown). The first printed circuit board 124 connected to the integrated circuit 106 and LED substrate 114 drives the integrated circuit 106 and LED substrate 114 corresponding to the control signals supplied from the second printed circuit substrate 126.

The light emitting display panel 130 includes a first substrate 130a and a second substrate 130b. Organic LEDs (not shown) are arranged on the first substrate 130a in matrix form. The organic LEDs generate a predetermined amount of light corresponding to the amount of current supplied. The light emitting display panel 130 is connected to the second printed circuit board 126 by the second pad unit 136 of the flexible printed circuit board 132. An integrated circuit 134 is mounted on the flexible printed circuit board 132. The integrated circuit 134 lets the light emitting display panel 130 display a predetermined image in response to the control signals supplied from the second printed circuit board 126.

A light fence 105 is provided between the liquid crystal display panel 104 and the backlight assembly 150. For example, the light fence 105 may be placed on the step unit 116a of the mold frame 116 mounted with the liquid crystal display panel 104. In this case, the light fence 105 is placed between the liquid crystal display panel 104 and optical sheets 110 as shown in FIG. 4. Both sides of the light fence 105 may be opaque to raise the efficiency of the light fence 105 superimposed on the non-pixel region 104_NA of the liquid crystal display panel 104 while surrounding the perimeter of the back surface of the liquid crystal display panel 104. An opening is formed in a predetermined part of the light fence 105 corresponding to the pixel region 104_A of the liquid crystal display panel 104. Thus, it is possible to prevent the light from being emitted into the non-pixel region 104_NA, thereby improving the image quality.

In addition, the light fence 105 may enhance the connection between the liquid crystal display panel 104 and the mold frame 116 since the light fence 105 is made of an adhesive member such as double-sided tape. The light fence 105 is attached with an inner opening to the liquid crystal panel 104 so that it surrounds the entire perimeter of the panel 104. For example, the light fence 105 may be attached in the shape of a flattened rectangular border frame to be superimposed on the non-pixel region 104_NA. When the light fence 105 is attached with an inner enclosed structure to the panel 104, debris P' is effectively screened from entering the backlight assembly 150. More specifically, although the debris P' may enter the space between the liquid crystal display panel 104 and the side surface of the mold frame 116, it is difficult for the debris to enter the backlight assembly 150 due to the light fence 105 formed of double-sided tape. Thus, it is possible to prevent image quality from being deteriorated due to the inflow of debris.

Figure 6:
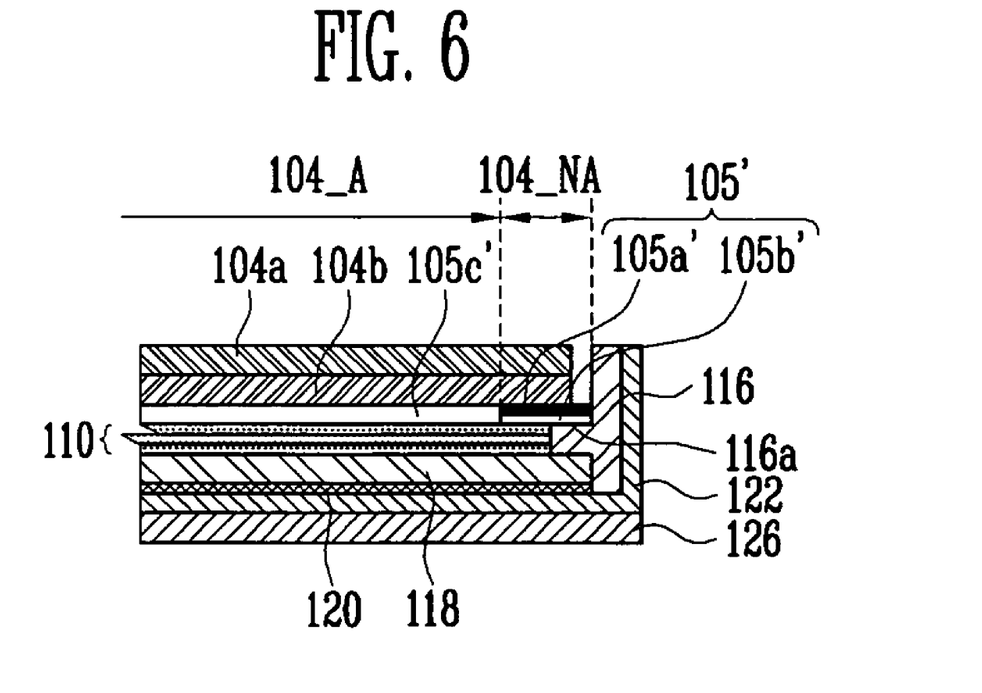
FIG. 6 is a sectional view of the application of the light fence according to another exemplary embodiment of the present invention
Figure 7A:
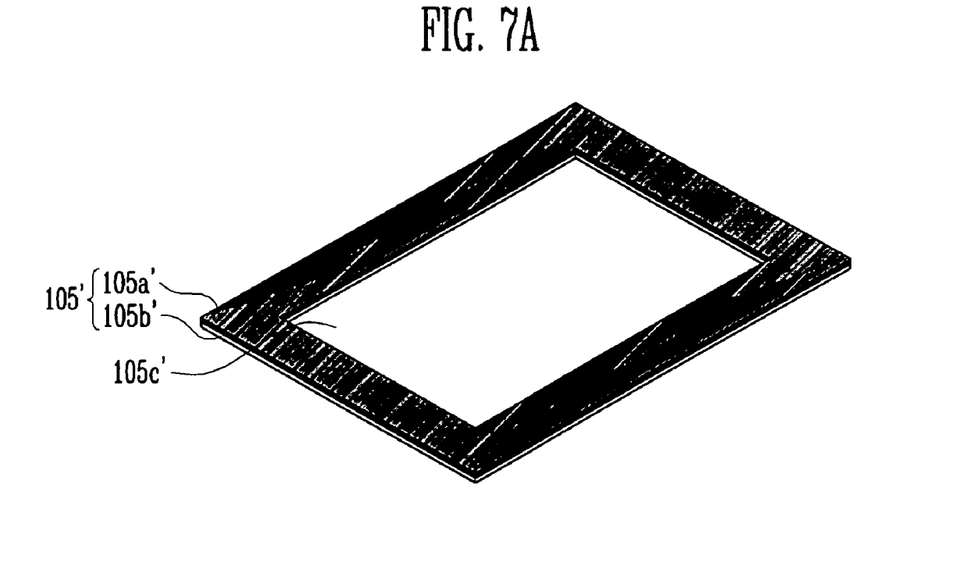
FIGS. 7A and 7B are perspective views of one side and its opposite side of a light fence according to the embodiment of the present invention shown in FIG. 6.
Figure 7B:
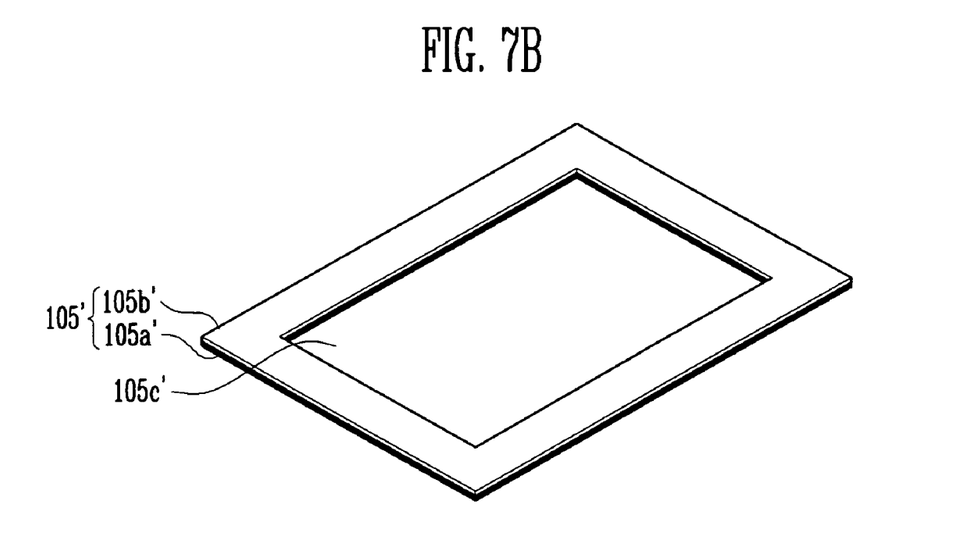

In an alternate embodiment as shown in FIGS. 6, 7A and 7B, the color of both sides of the light fence 105 may be different from each other to raise the brightness of pixel region 104_A by increasing the light efficiency. More specifically, a first surface 105a' of the light fence 105' may be opaque, such as black, and a second surface 105b' of the light fence 105' may be white or silver. However, the color of the second surface 105b' of the light fence 105' is not limited to white or silver, but may be any color.

The principle of preventing light leakage into the non-pixel region 104_NA by the light fence will be described below using the display device of FIG. 4, but with the light fence embodiment shown in FIGS. 6, 7A and 7B.

A light leak occurs if light from the backlight assembly 150 is emitted into the non-pixel region 104_NA. For example, light leakage can occur when light is emitted from the LEDs 112 via the light sheets 110 to the non-pixel region 104_NA between the liquid crystal display panel 104 and the mold frame 116. When the light fence 105' is placed between the liquid crystal display panel 104 and the step unit 116a of mold frame 116, the first surface 105a' of light fence 105' being opaque and the second surface 105b' being a reflective color such as white or silver, light which directed to the non-pixel region 104_NA is reflected by the second surface 105b' of light fence 105' and is directed via the optical sheets 110 to the light guide plate 118. Thus, most of light supplied to the light guide plate 118 is supplied to the pixel region 104_A of the liquid crystal display panel 104. As such, directing light into the pixel region 104_A instead of the non-pixel region 104_NA prevents light leakage and raises the light efficiency, improving the brightness of the pixel region 104_A. In addition, setting up the first surface 105a' of the light fence 105' as opaque reduces future light leaks. The second display panel may be set up as a light-emitting display panel 130, for instance, a liquid crystal display panel. In this case, light reflected from the light fence 105' to the light guide plate 118 is supplied to the second display panel, thus enhancing the brightness of the second display panel.

As described above, a portable display device according to the present invention may prevent light leakage and enhance light efficiency, improving image quality. In one exemplary embodiment, a light fence is placed between a liquid crystal display panel and the backlight assembly. In addition, a portable display device according to the present invention may enhance the connection between a liquid crystal display panel and a mold frame to prevent the deterioration of image quality due to debris by forming the light fence with an adhesive member such as double-sided tape.

Although exemplary embodiments of the present invention have been shown and described, it will be appreciated by those skilled in the art that changes might be made to these embodiments without departing from the principles and spirit of the invention, the scope of which is defined in the claims and their equivalents.

What is claimed is:

1. A portable display device comprising:
   a display panel;
   a backlight assembly having a light source for supplying light to the display panel and having a molded frame with a periphery step; and
   a light fence having a first planar surface and a second planar surface opposite the first planar surface, the light fence mounted on the periphery step to support the display panel at a periphery of the backlight assembly and to screen light supplied from the light source, wherein the first planar surface and the second planar surface are light absorbing surfaces and wherein the light fence has an opening configured to generally correspond to a portion of the display panel such that an open space is between the display panel and the backlight assembly.

2. The portable display device as claimed in claim 1, wherein the light fence is attached to a non-pixel region of the display panel.

3. The portable display device as claimed in claim 1, wherein the first planar surface has a first color; and wherein the second planar surface has a second color.

4. The portable display device as claimed in claim 1, wherein the light fence comprises double-sided tape.

5. The portable display device as claimed in claim 1, wherein the display panel comprises a liquid crystal display panel.

6. A light fence for a display device, the display device having a display panel with both a display area and a non-display area and a backlight assembly having a light source for supplying light to the display panel and having a molded frame with a periphery step, the light fence comprising:

a planar frame sized to conform to the display area and having an opening sized to correspond to at least a portion of the display area, the planar frame being mountable on the step unit and having a first planar surface and a second planar surface, wherein the first planar surface and the second planar surface are light absorbing surfaces and wherein the opening serves to provide an open space between the display panel and the backlight assembly.

7. The light fence of claim 6, wherein the light fence comprises an adhesive.

8. The light fence of claim 7, wherein the light fence comprises double-sided tape.

* * * * *